Patented Mar. 27, 1923.

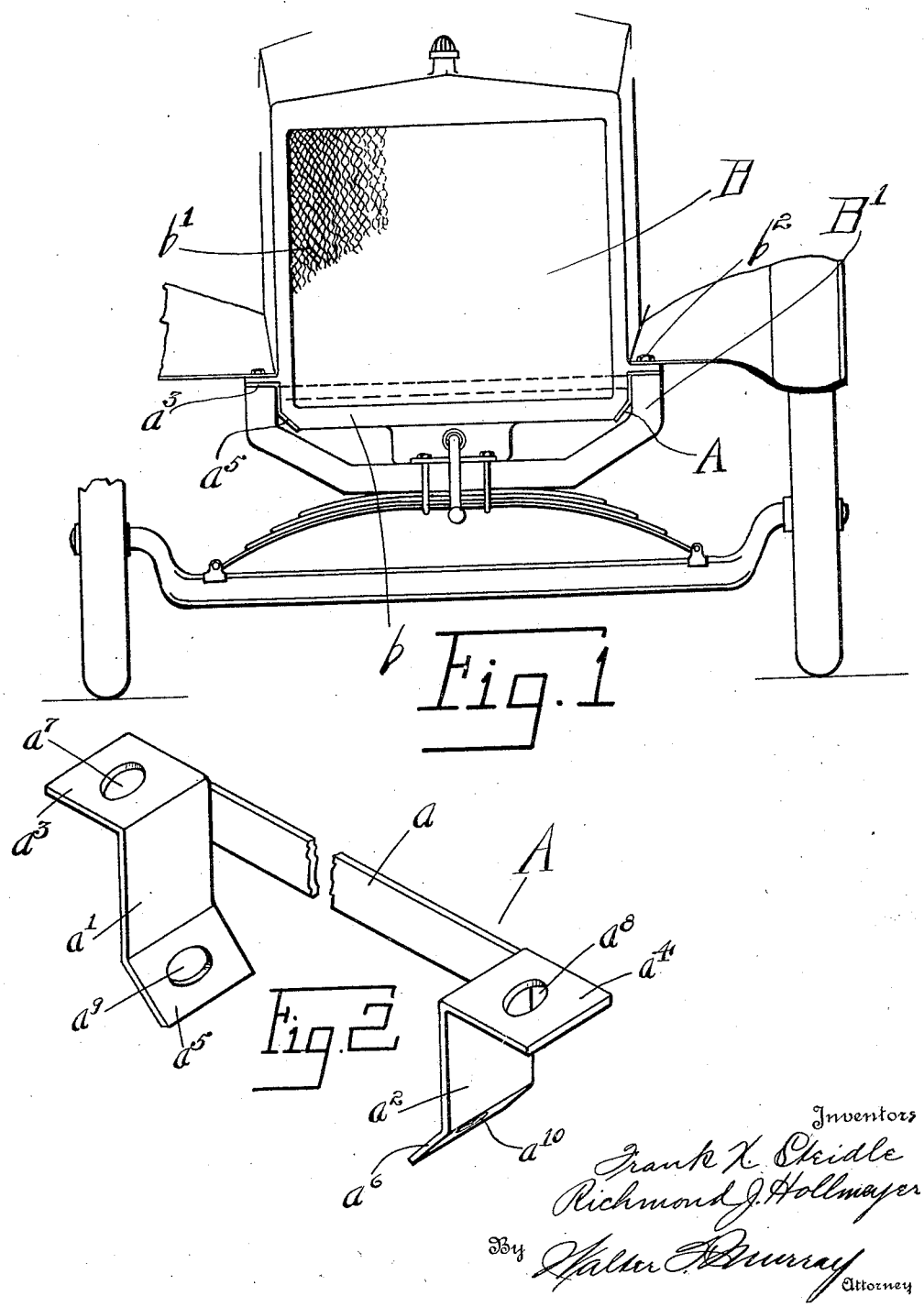

1,449,960

UNITED STATES PATENT OFFICE.

FRANK X. STEIDLE, OF CINCINNATI, OHIO, AND RICHMOND J. HOLLMEYER, OF NEWPORT, KENTUCKY.

RADIATOR MOUNTING.

Application filed September 14, 1921. Serial No. 500,475.

*To all whom it may concern:*

Be it known that we, FRANK X. STEIDLE and RICHMOND J. HOLLMEYER, citizens of the United States of America, and residents of Cincinnati and Newport, respectively, in the counties of Hamilton and Campbell, respectively, and States of Ohio and Kentucky, respectively, have invented a new and useful Improvement in a Radiator Mounting, of which the following is a specification.

Our invention relates to mounting means for the radiators of automobiles and has for an object the elimination of ruptures between the radiator strips and the tank at the base thereof.

Our invention is especially intended for use with radiators referred to as a honeycomb type of radiator, although it may be employed with other radiators.

Another object of our invention is to provide a simple holder or mounting for such radiators.

These and other objects are attained by the means described herein and disclosed in the accompanying drawings, in which Fig. 1 is a fragmental front elevation of an automobile having a device embodying our invention mounted thereupon.

Fig. 2 is a perspective view of a mounting embodying our invention.

The radiator holder or mounting A comprises a cross bar $a$ having at its opposite ends the end plates $a'$ and $a^2$, which plates are disposed on a common side of the bar and are formed integral with and extend at an angle to the cross bar. Lugs $a^3$ and $a^4$ extend at an angle from the upper ends of plates $a'$ and $a^2$ respectively and are disposed in substantial parallelism with one another and with the cross bar $a$. Bottom lugs $a^5$ and $a^6$ extend inwardly and toward one another from the lower ends of the end plates $a'$ and $a^2$. The lower lugs $a^5$ and $a^6$ are disposed at such angles to the plates $a'$ and $a^2$ as will accommodate the bottom tank $b$ of the radiator B. The cross bar $a$ is so disposed in relation to the plates $a'$ and $a^2$ that when the holder A is mounted upon the frame of an automobile, the cross bar will assume a position immediately above the bottom tank $b$, leaving sufficient space between the cross bar and the tank to permit soldering of the radiator strips $b'$ upon the tank $b$. The upper lugs $a^3$ and $a^4$ have slots $a^7$ and $a^8$ formed therethrough, through which suitable fastening means, such as bolts $b^2$, may be passed in order to secure the radiator holder upon an automobile frame B'. The lower lugs $a^5$ and $a^6$ have similar slots $a^9$ and $a^{10}$ to permit sweating of the radiator tank $b$ upon lugs $a^5$ and $a^6$ of the holder.

When the holder A is mounted upon the automobile frame B', the bolts $b^2$ secure the radiator and the holder A in a fixed relation to the frame. The cross bar $a$, although it permits vibration of the frame, precludes movement of the forward ends of the frame in opposite directions at the same time, thereby eliminating any probability of rupture to the radiator or the tank thereof, because of vibration of the frame.

What we claim is:

An automobile radiator mounting comprising a cross bar, end plates on the cross bar extending in substantial parallelism on a common side of the bar, top lugs on the end plates adapted to be secured upon an automobile frame, and bottom lugs on the end plates adapted to support a radiator.

In testimony whereof, we have hereunto subscribed our names this 13th day of September, 1921.

FRANK X. STEIDLE.
RICHMOND J. HOLLMEYER.